United States Patent [19]

Travade et al.

[11] Patent Number: 4,676,893
[45] Date of Patent: Jun. 30, 1987

[54] APPARATUS FOR THE RECOVERY OF LIVING ORGANISMS ON THE ROTARY FILTERS OF WATER PUMPING STATIONS

[75] Inventors: François Travade, Paris; Lionel Caudron, Croissy/Seine, both of France

[73] Assignee: Electricite de France Service National, Paris, France

[21] Appl. No.: 715,373

[22] Filed: Mar. 25, 1985

[30] Foreign Application Priority Data

Mar. 27, 1984 [FR] France ................................. 84 04765

[51] Int. Cl.$^4$ ............................................. B01D 33/10
[52] U.S. Cl. ...................... 210/157; 210/158; 210/161; 210/330; 210/333.01; 210/393; 119/3
[58] Field of Search ............... 210/157, 158, 161, 330, 210/333.01, 391, 393; 119/3

[56] References Cited

U.S. PATENT DOCUMENTS

| 1,799,299 | 4/1931 | Johnston | 210/391 |
| 2,267,086 | 12/1941 | Donohue | 210/391 |
| 3,221,887 | 12/1965 | Schade | 210/330 |
| 3,868,324 | 2/1975 | Taylor | 210/158 |
| 4,169,792 | 10/1979 | Dovel | 210/158 |
| 4,192,749 | 3/1980 | Jackson | 210/161 |
| 4,447,323 | 5/1984 | Jackson | 210/158 |
| 4,447,324 | 5/1984 | Jackson | 210/161 |
| 4,518,494 | 5/1985 | Jackson | 210/393 |
| 4,541,930 | 9/1985 | Heidler | 210/161 |

Primary Examiner—Ernest G. Therkorn
Attorney, Agent, or Firm—Spencer T. Smith

[57] ABSTRACT

Apparatus for the release and recovery of living organisms collected or trapped on the rotary filters of water pumping stations.

The apparatus comprises:

on the inside of the filters, a system of two rows of multiple washing jets using water under low pressure, whose nozzles are directed towards the filter panels, so that the jets of the two rows meet one another and cooperate to form a single liquid stream;

deflectors arranged at radial intervals on the outer face of the filter panels;

on the outside of the filters, a channel shaped like a trough for receiving the washing water and recovering the living organisms, whose opening is oriented towards the said rows of washing jets, the edge of the opening being rounded or rotary in its lower part.

6 Claims, 5 Drawing Figures

APPARATUS FOR THE RECOVERY OF LIVING ORGANISMS ON THE ROTARY FILTERS OF WATER PUMPING STATIONS

BACKGROUND OF THE INVENTION

The present invention relates to an apparatus for the release and recovery of living organisms trapped or collected on rotary filters of water pumping stations. The invention relates to an apparatus for use e.g. on filters placed at the inlet of the cooling water circuits of thermal power stations, or on water intakes for urban or agricultural use.

Pumping stations located beside the ocean, lakes and rivers are equipped with drum-type rotary filters, which sometimes have a diameter of 20 meters and their surface is constituted by a system of filter panels having meshes, whose apertures generally have diameters of a few fractions of a millimeter to a few millimeters (3 to 5 mm in the case of French power station water intakes).

Water drawn from the outside towards the inside of the filter, or in the reverse direction contains rubbish and floating material, such as branches, paper, plastic material and the like, which is held back by the filters together with all other living organisms and materials, which are larger than the diameter of the meshes.

The cleanness of the filters necessary for retaining filtering function is ensured by permanent or intermittent cleaning using high pressure water jets located on the upper non-submerged part of the filters. For this purpose, the drum rotates about its axis and the non-submerged filter panels pass in front of a horizontal row of washing means, positioned inside or outside the filter drum, depending on whether filtration takes place from the outside to the inside of the drum or vice versa. The various materials and living organisms stuck to the filter screen are displaced by the water and recovered in a horizontal channel positioned alongside the filtering face.

The filters are cleaned by the action of water jets at a high pressure of approximately 4 to 6 bars. Under these conditions, living organisms are killed or seriously injured by the mechanical shocks to which they are exposed under the action of high pressure water jets and their spraying at high speed against the walls of the inappropriately shaped recovery channel. These organisms are also seriously traumatized by the start of asphyxia resulting from a varyingly long emersion.

To remedy the serious damage to the natural environment and to attempt to provide recovery means which are as advantageous as possible to living organisms, several solutions have already been proposed. Some of them are based on the principle of the recovery of the organisms through the combined use of gravity and a low pressure water jet. However, all these solutions are unusable on certain filters and particularly on those of the drum type, in which filtration takes place from the outside to the inside, because then gravity cannot be used for recovering the organisms.

The object of the present invention is to obviate these disadvantages by supplying a release and recovery apparatus using a stream of water and without using the gravity of the organisms on the rotary filters of the water pumping stations. Such an apparatus is placed in the rising non-submerged part of the filter along a generatrix of said filters and comprises:
on the inside of the filters, a system of two rows of multiple washing jets using water under low pressure, whose nozzles are directed towards the filter panels, so that the jets of the two rows meet one another and cooperate to form a single liquid stream;
deflectors arranged at radial intervals on the outer face of the filter panels;
on the outside of the filters, a channel shaped like a trough for receiving the washing water and recovering the living organisms, whose opening is oriented towards the said rows of washing jets, the edge of the opening being rounded or rotary in its lower part.

It is obvious that the arrangement on either side of the filter panels of the two rows of washing jets and the channel is given here in the case where filtration takes place from the outside to the inside of the filter and that it is reversed in the case when filtration takes place in the opposite direction.

As a result of this arrangement of the apparatus and in particular as a result of the combined effect of the action of the deflectors, the low pressure water jets and the profile of the channel, the living organisms are released from the filter panels and gently displaced at low speed in the channel in a homogeneous liquid stream, without being subject to shocks so that they can be subsequently restored to their natural ambient under better conditions.

BRIEF DESCRIPTION OF THE DRAWINGS

The invention is described in greater detail hereinafter relative to a non-limitative embodiment of the apparatus according to the invention with reference to the attached drawings, wherein show.

DETAILED DESCRIPTION OF THE INVENTION

Figure 1:
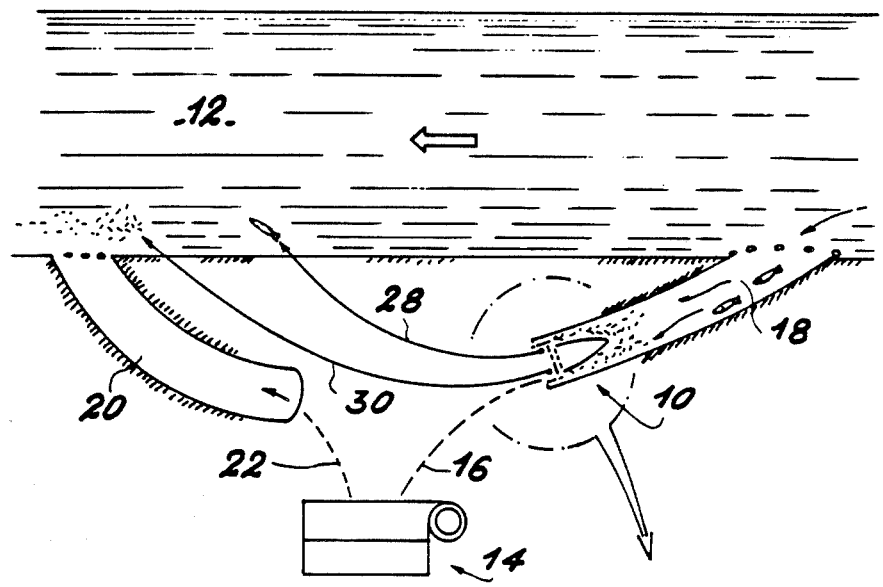
FIG. 1 diagrammatically and in exemplified manner, a pumping station of a thermal power station showing the precise positioning of the apparatus according to the invention.

As can be seen in FIG. 1, the pumping station 10 is in this case located adjacent to a river 12 close to a thermal power station 14, which it supplies with cooling water by a pipe 16, indicated here by an arrow.

The pumping station is installed at the bottom of an arm 18 running out into river 12, whilst the cooling water supplying the power station is returned by a pipe 22 to a arm 20, which also opens out into river 12.

Figure 2:
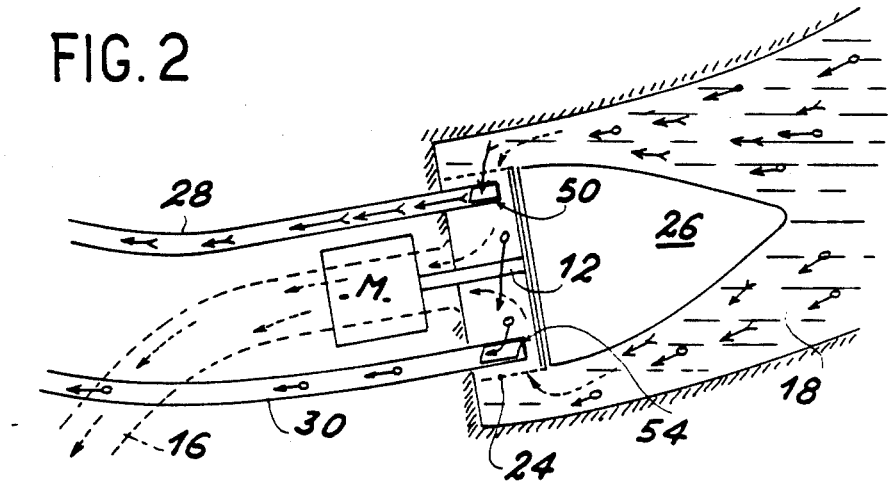
FIG. 2 a diagrammatic larger scale view of the pumping station.

As can be seen in FIG. 2, the pumping station comprises a drum filter 24 driven by a motor M. A large deflector 26 in front of the filter forces the water containing rubbish with small dimensions and living organisms to pass on either side of the filter into the narrows formed by the actual filter, the edges of the arm 18 and a wall of the actual pumping station.

As will be shown in greater detail hereinafter, on leaving the filter, most of the living organisms follow the pipe 28, whereas the rubbish is mainly discharged by pipe 30, everything being passed directly into the river.

The filtered water follows pipe 16 prior to cooling the power station 14.

Figure 3:
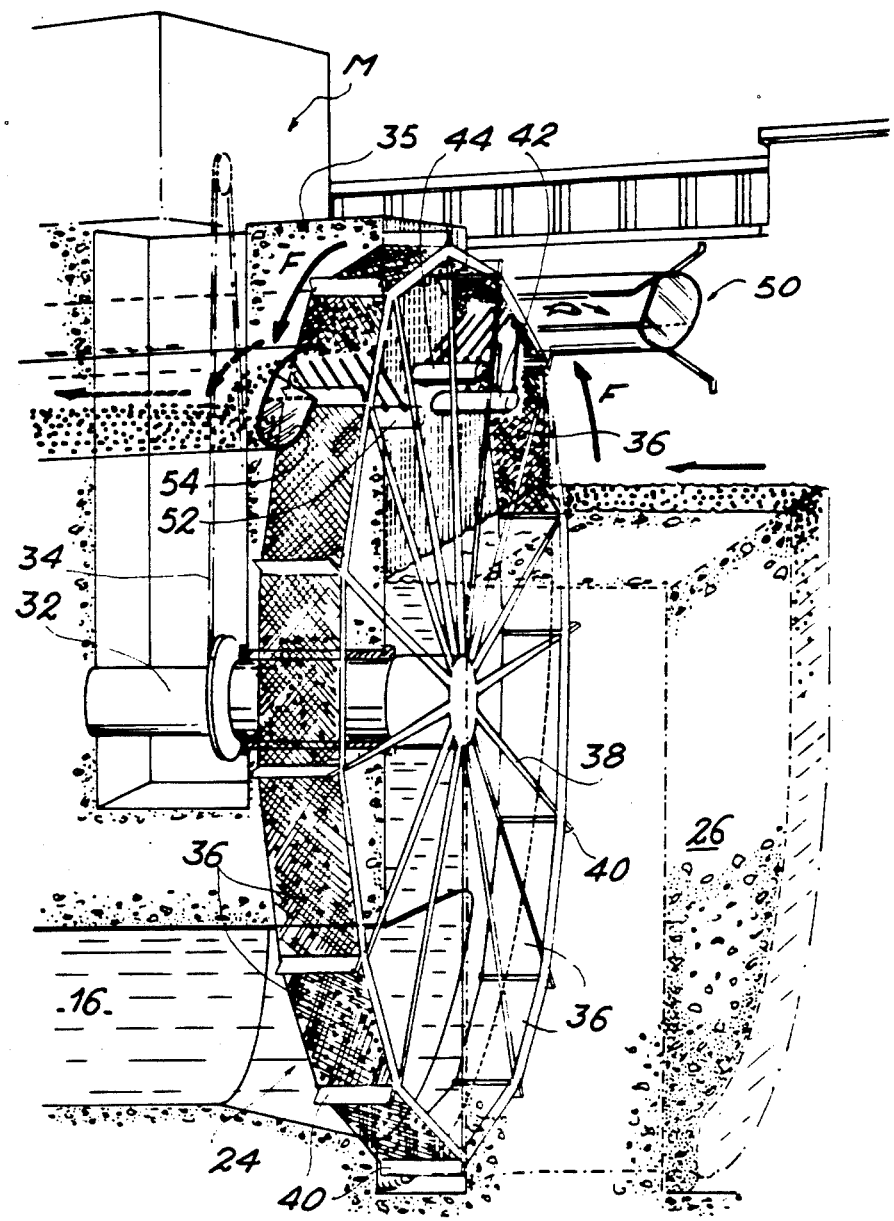
FIG. 3 a perspective view of a drum filter in the operating position.

The filter shown in FIG. 3, partly in perspective and partly in broken away form, is shown as a wheel, whose shaft 32 is positioned horizontally in a bearing in a wall 35 of the station. Shaft 32 is driven by motor M by means of a belt 34 or any other appropriate drive means. The outer circumference of the wheel is constituted by a succession of identical, rectangular filter panels 36, which are adjacent in pairs by their homologous sides.

Figure 4:
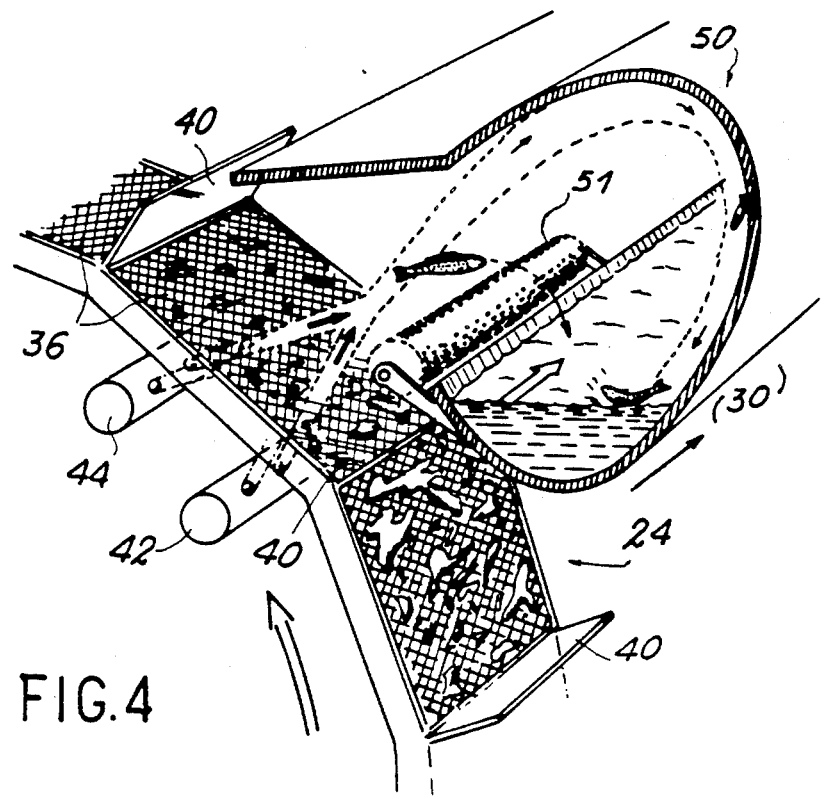
FIG. 4 an apparatus for recovering fish and other living organisms.
Figure 5:
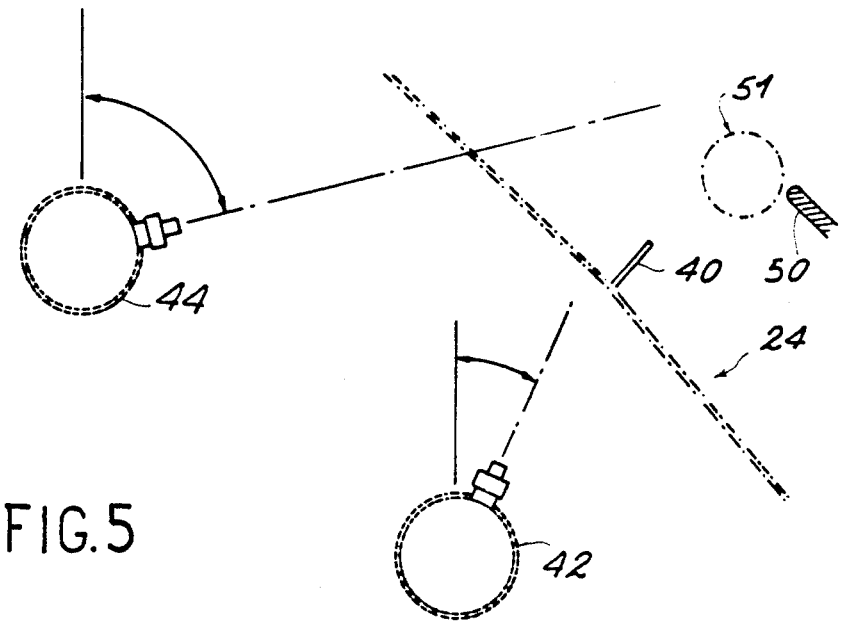
FIG. 5 a diagrammatic axial section of two rows of washing jets showing the slope of the nozzles and small deflectors of the present apparatus.

As is shown in FIG. 4, at their junction, the filter panels 36 are equipped with small deflectors 40.

In the non-submerged part of the wheel, are provided two rows of washing jets, namely a lower row 42 and an upper row 44, which respectively release the living organisms and move them into a channel 50. These two rows are supplied with water at a low pressure of approximately 0.2 to 1 bar. The water discharge nozzles have a diameter of approximately 8 mm and are inclined by 30° and 70° relative to the vertical, respectively in the case of the lower row and the upper row. Outside the filter and facing the two rows is fitted the channel 50 in the form of a trough, whose lowest edge 51 is rounded, or can even be formed by a roller in order to assist the careful passage of the living organisms and prevent the accumulation of rubbish.

As can be seen in FIG. 3, the wheel is driven from right to left, as indicated by arrow F. The drawing in of water by pipe 16 moves the rubbish and living organisms, which are trapped and displaced on the filter panel, with the cooperation of small deflectors 40, whereby they are released and sprayed with water at low pressure when they pass level with the apparatus according to the invention. The organisms are then gently moved in to the channel 50 and can be discharged by the pipe 28 back into the river 12. The low pressure jets are not sufficient to disengage all the rubbish, which is generally larger than the organisms. Thus, there is also a similar apparatus equipped with water jets at a high pressure of approximately 4 to 8 bars is proided symmetrically on the other side of the wheel, but still in the non-submerged zone and the rubbish is disengaged on this occasion through the action of the row of jets 52 and is passed into a channel 54, followed by discharge into the river by pipe 30.

As a result of the use of the apparatus according to the invention, excellent results can be obtained. Thus, unlike in the case of a high pressure apparatus of the known type, which is only able to cover in living form and in a seriously disturbed state about 50% of the organisms around the filter, the present apparatus makes it possible to recover 90 to 95% of viable living organisms.

What is claimed is:

1. A cleansing system for a drum-type rotary filter having a cylindrical filtering drum comprised of screening panels for preventing the passage therethrough of living organisms or debris as water is pulled from the outside to the inside of the filter, the filter being supported for rotational displacement about a horizontal axis and adapted to have a portion of the drum above the surface of the water being filtered, said cleansing system comprising
    channel means outside the drum extending parallel to the drum above the surface of the water, said channel means having an edge adjacent the drum,
    first cleansing means inside the drum extending parallel to said channel means, said first cleansing means comprising means for directing a first plurality of concentrated water jets in a first selected direction at a pressure sufficiently low to avoid injury to living organisms, through the drum above said edge of the channel means, and
    second cleansing means inside the drum extending parallel to and above said first cleansing means, said second cleansing means comprising means for directing a second plurality of concentrated water jets in a second direction defining a selected angle with the first direction, at a pressure sufficiently low to avoid injury to living organisms, through the drum at a location spaced from said first plurality of water jets and above said edge of the channel means to merge with said first plurality of concentrated water jets at a selected location beyond the drum to form a single liquid stream,
    whereby living organisms will be propelled without injury by said first and second cleansing means into said channel means.

2. A cleansing system according to claim 1 wherein said channel means edge is rounded.

3. A cleansing system according to claim 2 wherein said channel means comprises a channel and a roller mounted adjacent said channel, said roller comprising the rounded edge of said channel means.

4. A cleansing system according to claim 1, further comprising
    second channel means outside the drum extending above the surface of the water and parallel to the drum at a location downstream of said first channel means, and said second channel means having an edge adjacent the drum,
    third cleaning means inside the drum extending parallel to said second channel means comprising means for directing a third plurality of water jets, above the edge of said second channel means at a pressure high enough for propelling debris on the surface of the drum into said second channel means.

5. A cleansing system according to claim 4, wherein said first channel means is located at the side of the drum leaving the water and said second channel means is located at the side of the drum entering the water.

6. A cleansing system according to claim 4, wherein said first channel means includes a concave surface oriented to substantially tangentially receive the merged single liquid stream.

* * * * *